No. 808,062. PATENTED DEC. 26, 1905.
W. S. ADAMS.
CAR TRUCK FOR MOTOR PROPULSION AND THE LIKE.
APPLICATION FILED NOV. 29, 1902.
3 SHEETS—SHEET 1.
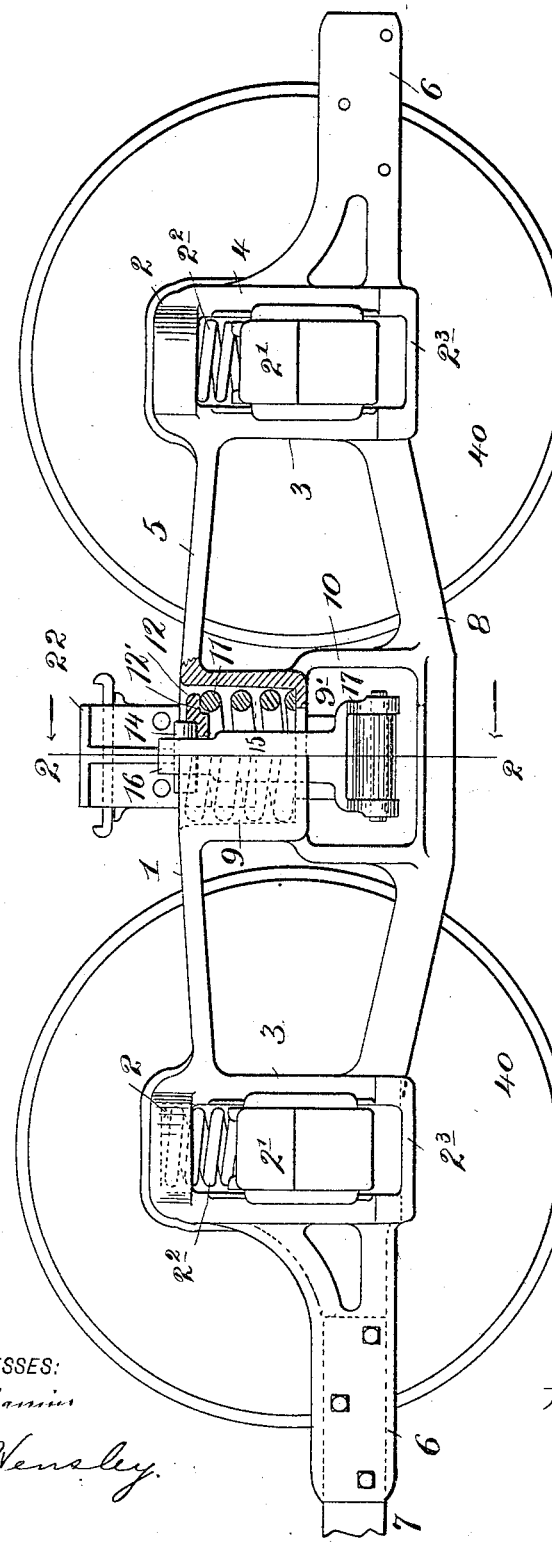

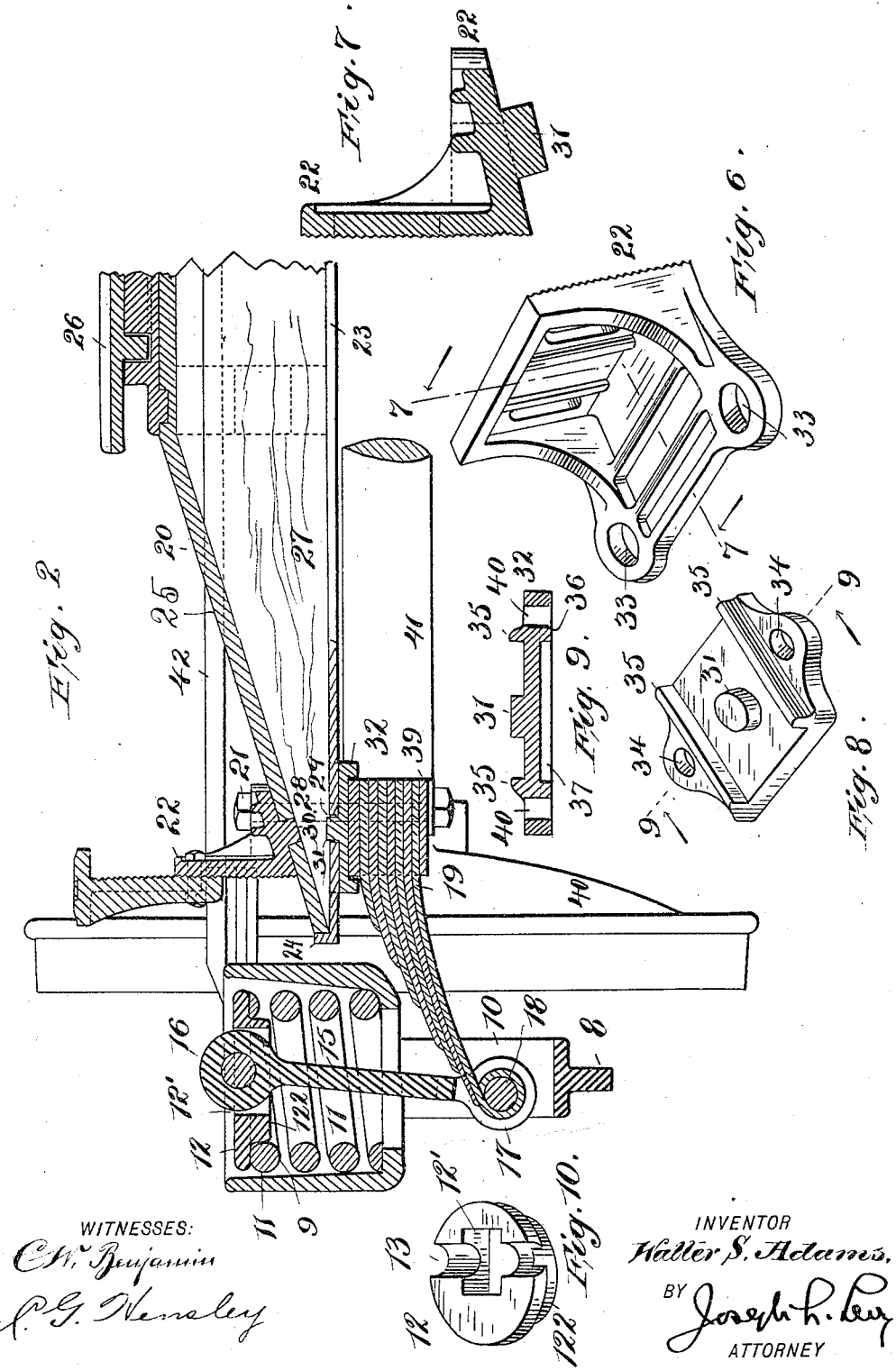

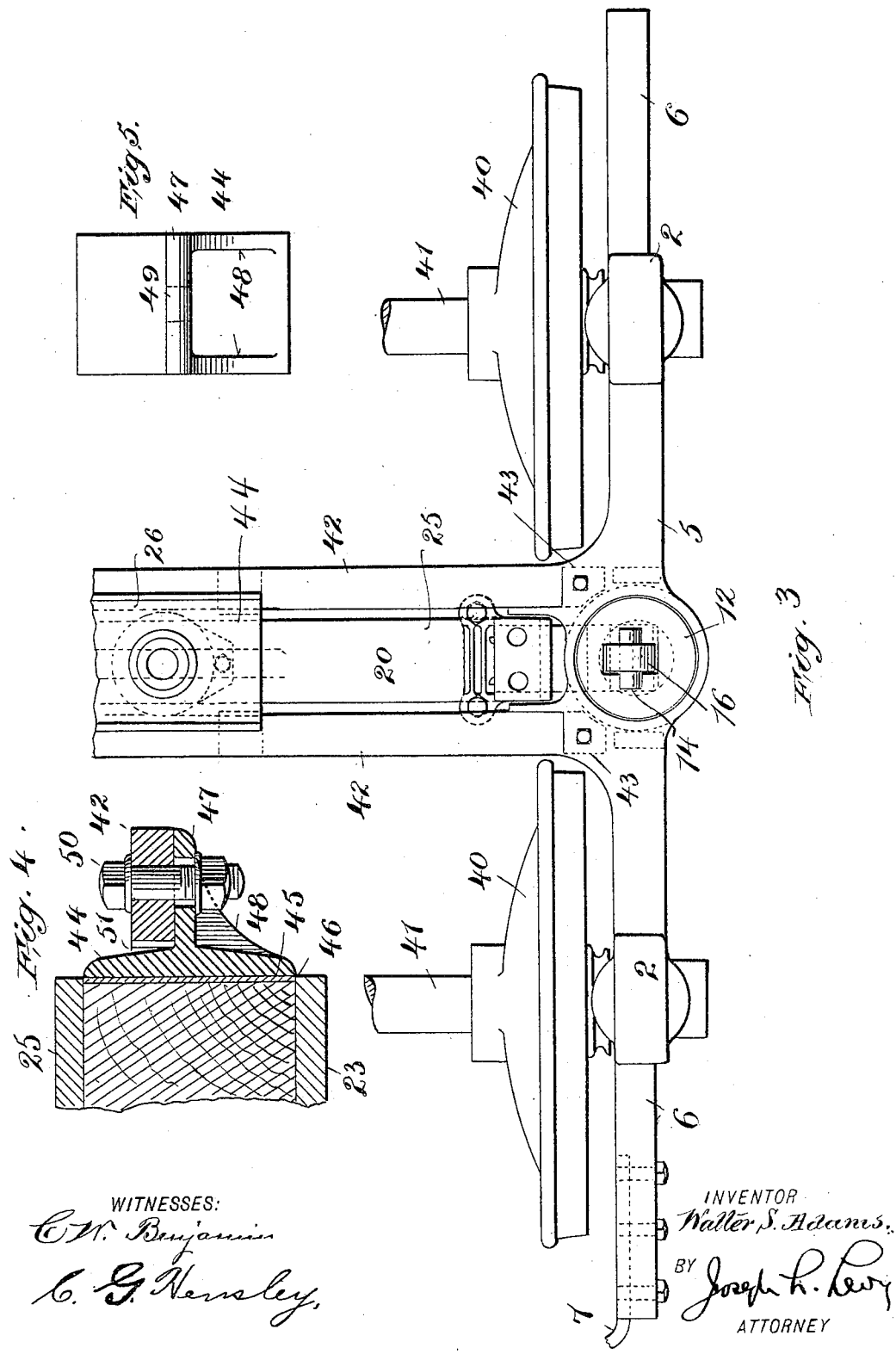

UNITED STATES PATENT OFFICE.

WALTER S. ADAMS, OF PHILADELPHIA, PENNSYLVANIA, ASSIGNOR TO JOHN A. BRILL, OF PHILADELPHIA, PENNSYLVANIA.

CAR-TRUCK FOR MOTOR PROPULSION AND THE LIKE.

No. 808,062.     Specification of Letters Patent.     Patented Dec. 26, 1905.

Application filed November 29, 1902. Serial No. 133,218.

*To all whom it may concern:*

Be it known that I, WALTER S. ADAMS, a citizen of the United States, and a resident of the city and county of Philadelphia, State of Pennsylvania, have invented certain new and useful Improvements in Car-Trucks for Motor Propulsion and the Like, of which the following is a specification.

My invention relates to improvements in car-trucks generally; and it has special relation to improvements in car-trucks designed for the purpose of carrying a motor for electric propulsion and the like; and it consists in the novel construction and combination of parts hereinafter described, and further pointed out in the claims.

In the drawings forming part of this specification, Figure 1 is a side elevation of a truck embodying my improvements, a part being shown in section. Fig. 2 is a sectional elevation taken on the line 2 2, Fig. 1; and Fig. 3 is a plan view of a part of the truck. Fig. 4 is a cross-section of the bolster, adjustable wear-piece, and transoms. Fig. 5 is an elevation of the wear-plate. Fig. 6 is a perspective view of the lower portion of the side bearing. Fig. 7 is a section taken on the line 7 7 of Fig. 6 looking in the direction of the arrows. Fig. 8 is a perspective view of the plate to which the quarter-elliptic spring is secured. Fig. 9 is a section on the line 9 9 of Fig. 8 looking in the direction of the arrows. Fig. 10 is a perspective view of the spring-cap.

Similar numerals of reference indicate corresponding parts throughout the several views.

The frame of the truck, to which as to its general features I make no claim in this application, consists substantially of the side frames 1, each frame having inverted-U-shaped axle-box yokes 2, of the usual form, each yoke having depending inner and outer box-controlling arms 3 and 4 and a side bar or upper chord 5, and integral therewith is a cup 9, which is provided with extensions 10, which are united to the tie-rods 8. Attached to the arms 4 between their extremities are the extensions 6, which may be connected with corresponding extensions on the other side frames by cross-bars 7, which form supports for the motors. The yokes 2, extensions 6, upper chord 5, and tie-rods 8 may be cast or forged of one integral piece, if so desired.

In the yokes 2 are the axle-boxes 2', sliding between the guides 3 and 4 and supporting springs 2², on which the yokes 2 rest, and the lower extremities of the guides 3 and 4 are the tie-rods 2³. The truck is carried by the wheels 40 and axles 41, which are journaled in the axle-boxes, all of which may be of any desired and suitable form.

The cups 9 are provided at their lower extremities with the integral flanges 9', on which rest coiled springs 11, and on these springs rest annuli 12, provided with eccentric openings 12' and grooves 12², adapted to fit and rest on the springs 11. At 13 are recesses in the walls of said annuli adjacent to the eccentric openings, and rods 14 rest therein. These rods support links 15, which have enlarged ends 16, through which the rods 14 pass, and are provided at their lower ends with stirrups 17, through which passes a rod 18, which form bearings for the free ends of quarter-elliptic springs 19, which are secured to a bolster 20 by means of bolts 21, which pass through portions of the side bearing 22. The bolster 20 consists of the transverse bar 23, having upturned ends 24, against which rest the ends of the arch-bar 25. The arch-bar 25 is provided on its upper portion with the usual flat portion to receive the center bearing 26, and between the bars 23 and 25 is the wooden filling 27. Near their extremities the bars 23 and 25 are provided with perforations 28 and 29, respectively, which fit and receive corresponding lugs 30 and 31 of the side bearing 22 and plate 32. The side bearing 22 and the plate 32 are provided with perforations 33 and 34, and the plate 32 has parallel flanges 35 adjacent to the perforations 34 and on the same face as the projection 31. On its other face the plate 32 is provided with flanges 36, extending parallel to the flanges 35 and flanges 37, the flanges 36 and 37 forming recesses 38, in which rest the bands 39 of the quarter-elliptic springs 19. The bolts 21 pass through the bands 39, perforations 34 on each side of the bolster 20, and through the perforations 33, thus fixing the quarter-elliptic spring to the bolster and securing the side bearing in place. The side bearings are preferably made adjustable in the manner shown and described in my Patent No. 709,071, dated September 17, 1902, although any suitable side bearing may be used.

The side frames 1 may be connected by transoms 42, which are secured to the lugs or projections 43 on the chords 5. Adjacent to each end of the center bearing 26 are wear-plates 44 on the transoms 42, as indicated in dotted lines in Fig. 3 and shown in greater detail in Figs. 4 and 5. These wear-plates are provided with a rubbing-surface 45, which contacts with a corresponding surface 46, sunk into the bolster, and the surface 45 is kept in its proper position by means of a flange 47 with an upper surface which fits the lower side of the transom, and on the lower surface of the flange 47 are reinforcing-webs 48. Centrally located between these webs 48 is a perforation 49, through which passes a bolt 50, which secures the wear-plate 44 to the transom, and the said flange 44 may be adjusted by means of the liners or packing-strips 51. These strips 51 are given a shape which enables them to fit snug when in place.

The links 15 are splayed outwardly, so that when stresses are put upon the quarter-elliptic springs 19 the springs force the lower ends of the links outwardly. The upper ends of the said links are pivoted eccentrically in the annuli 12, so that greater stress is put on that side of the spring 11 which is nearest to the bolster, and therefore the said springs are more distorted on that side and to some extent canted over. The annuli 12, which rest on the springs 11, are also inclined, so that their upper surface will always be substantially normal to the stresses transmitted by the links 15, and any tendency the bolster may have for vertical movement will be resisted with maximum effect by the combined action of the quarter-elliptic springs 19, the links 15, the annuli 12, and the springs 11.

It is evident that while the springs 11 will under normal stresses be deflected, as described above, yet under abnormal stresses, due to irregularities in the road-bed, action of the brakes, or other causes, the spring may be deflected toward any side of the cup 9 as may be necessary to counteract the effect of the stresses on the link 15, and the quarter-elliptic spring 19 will also be irregularly deflected, so that the bolster 20 will always be properly suspended in the truck regardless of the conditions under which the car is operated.

The center bearing 24, which unites the car-body with the bolster, may be of any well-known type and is in alinement with the bracket 48, so that any accelerated movement of the truck, due to the brakes, motors, or other causes, will be transmitted to the bolsters through the transoms in a vertical plane passing through the king-bolts, and all strains due to the transmission of motion from the trucks to the bolster are entirely eliminated from the bolster-springs.

Having thus described my invention, what I claim is—

1. In a car-truck, the combination with side frames, a cross-bolster, a resilient element extending longitudinally from said bolster at each end, springs supported by the side frames, and a lateral pivotal connection between said side-frame springs and said resilient elements.

2. In a car-truck, a side frame, a bolster, a quarter-elliptic spring rigidly attached to said bolster and spring-supported pivoted means for connecting said bolster and side frame.

3. In a car-truck, a side frame, a bolster, a quarter-elliptic spring rigidly secured to said bolster, and pivoted means for connecting said spring and side frame.

4. In a car-truck, the combination with side frames, a cross-bolster, a resilient element extending longitudinally from said bolster at each end, coiled springs supported upon the side frames in line with said bolster, and pendent links pivotally connecting said elements and coil-springs.

5. In a car-truck, a side frame, a bolster, a quarter-elliptic spring fixed to the said bolster, a coiled spring attached to said frame, and a link pivotally connecting said springs.

6. In a car-truck, a side frame, a bolster, a quarter-elliptic spring fixed to said bolster, a coiled spring resting in a cup in said frame, and a link connecting said springs.

7. In a car-truck, a side frame, a coiled spring, a bolster with a quarter-elliptic spring fixed thereto, a link with a stirrup pivoted to said quarter-elliptic spring and attached to said coiled spring.

8. In a car-truck, a side frame, a coil-spring with an annulus resting thereon, a bolster with a leaf-spring extending longitudinally thereof, and a link connecting said bolster and annulus.

9. In a car-truck, the combination with side frames and a cross-bolster, of upright coil-springs supported on the side frames in line with the ends of the said bolster, and links pivotally connected with the ends of said bolster pendent from the top of said spring, and supported thereon at one side of the vertical center of said spring.

10. In a car-truck, the combination with side frames and a cross-bolster, of upright coil-springs supported on the side frames, outwardly-splayed and pendent links pivotally supported on said springs on the inner side of their vertical centers, and a pivotal connection between the ends of the links and the bolster.

11. In a car-truck, the combination with side frames and a cross-bolster, of upright coil-springs supported on the side frames adjacent the ends of the bolster, outwardly-splayed and pendent links pivotally supported on said springs, on the inner side of their vertical centers, a leaf-spring extending from the end of the bolster, and a pivotal connection between the ends of said links and leaf-springs.

12. In a car-truck, a side frame, a coiled spring, an annulus resting on said coiled spring and provided with an eccentric opening, a bolster, and a pivoted means for connecting the bolster and annulus.

13. In a car-truck, a side frame, a coiled spring resting on said frame, an annulus with an eccentric opening on said spring forming a cap therefor, a bolster with a quarter-elliptic spring, and pivoted means for connecting said springs.

14. In a car-truck, a side frame, a coiled spring resting in a cup integral with said frame, an annulus with an eccentric opening and resting on said spring, a bolster with a quarter-elliptic spring fixed thereto, a link with one end pivoted to said quarter-elliptic spring and the other end pivoted in said eccentric opening.

15. In a car-truck, a side frame, a bolster, and means for connecting said side frame and bolster, said means comprising in its construction a quarter-elliptic spring.

16. As an article of manufacture, a bolster with a quarter-elliptic spring fixed thereto.

17. As an article of manufacture, a bolster, a side bearing, and a quarter-elliptic spring all secured together by means of bolts.

18. As an article of manufacture, an annulus with an eccentric opening and recesses forming journal-supports connected with said opening.

19. As an article of manufacture, an annulus with an eccentric opening and a groove on its interior whereby the said annulus will fit a spring.

20. As an article of manufacture, a side frame for a truck having an upper chord, a centrally-located cup integral with said chord and an inturned flange at the lower portion of the cup.

21. As an article of manufacture, a side frame for a truck having an upper chord, a cup integral with said chord and an internal flange at the lower portion of said cup, a lower chord and pendent supports uniting said cup and lower chord.

22. In a car-truck, a transom, a bolster, and rigid and adjustable means interposed between said transom and bolster for transmitting motion and extending above and below the plane of the transom.

23. In a car-truck, a transom, a bolster, and rigid and adjustable means for transmitting motion interposed between said transom and bolster and extending above and below the plane of the transom.

24. In a car-truck, a transom, with an adjustable bracket provided with a vertical wear-plate, and a bolster adapted to rest against said vertical wear-plate said wear-plate extending above and below the plane of the transom.

Signed in the city and county of Philadelphia, State of Pennsylvania, this 26th day of November, 1902.

WALTER S. ADAMS.

Witnesses:
 EDW. P. RAWLE,
 WM. J. FERDINAND.